No. 872,641. PATENTED DEC. 3, 1907.
W. F. BOUCHÉ.
SHAFT OSCILLATOR.
APPLICATION FILED AUG. 31, 1906.
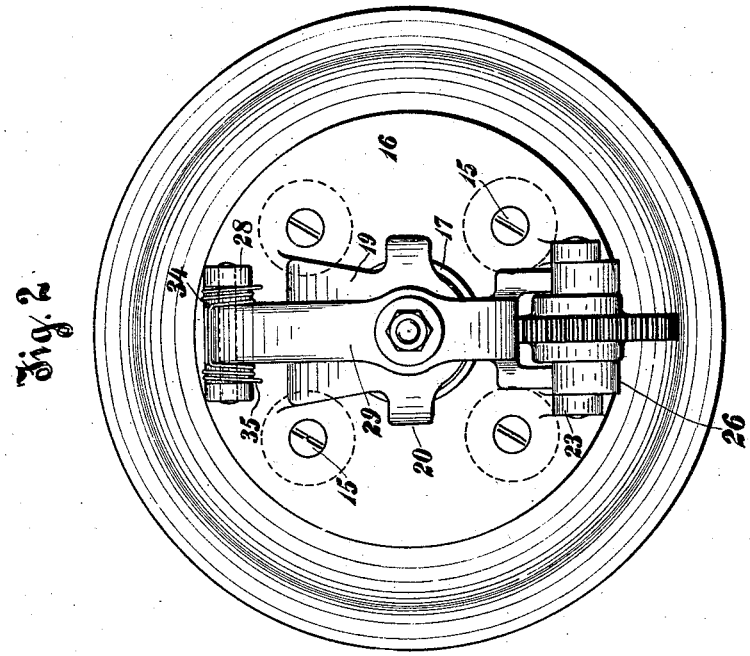
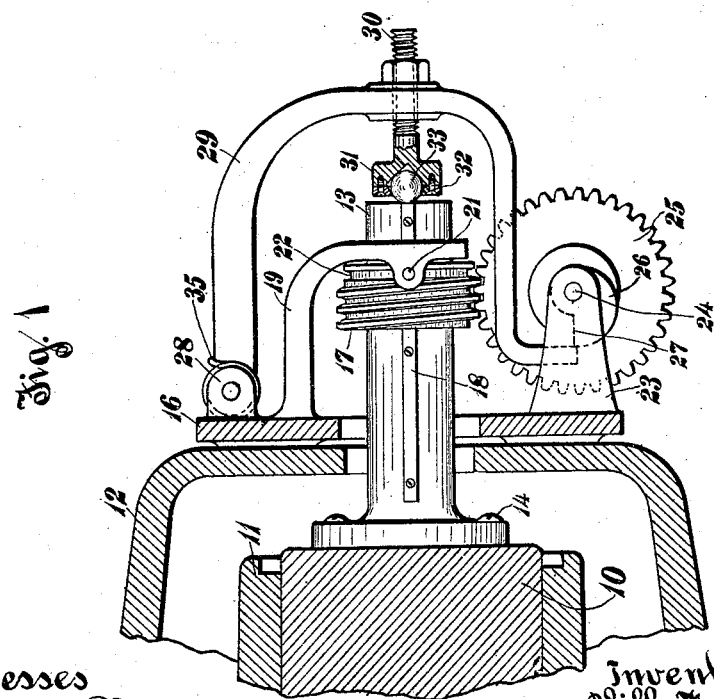
Witnesses
Oliver W. Sharman
Fred J. Kinsey
Inventor
Will F. Bouché
By
Chas. E. Lord
Attorney

UNITED STATES PATENT OFFICE.

WILL F. BOUCHÉ, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SHAFT-OSCILLATOR.

No. 872,641.             Specification of Letters Patent.           Patented Dec. 3, 1907.

Application filed August 31, 1906. Serial No. 332,745.

*To all whom it may concern:*

Be it known that I, WILL F. BOUCHÉ, citizen of the United States, residing at Norwood, in the county of Hamilton and State of Ohio, have invented certain new and useful Improvements in Shaft-Oscillators, of which the following is a full, clear, and exact specification.

My invention relates to means for oscillating or reciprocating shafts longitudinally in their bearings particularly shafts of dynamo-electric machines.

An oscillating movement given to a rotating element of a dynamo-electric machine, especially a rotary converter, causes the shaft of said element to operate in its bearings and prevents the wearing of the ridges and grooves in the commutator of the machine. Many mechanical and magnetic devices have been constructed for this purpose but none have proven entirely satisfactory.

The object of my invention is to produce the desired result by means of mechanical oscillator, which is positively driven from a shaft so that there can be no slip between the shaft and the oscillator.

In carrying out my invention I drive a rotary spindle from the shaft, which spindle operates an oscillatory member which moves the shaft longitudinally in its bearings.

Considering my invention more specifically I mount on the end of the shaft or upon an extension thereof, a worm wheel in such a manner that the wheel rotates with the shaft, but so that the shaft can move in a longitudinal direction relative to the wheel. On the end of the bearing housing I provide a frame which has a downwardly extending arm which engages the gear wheel so as to prevent a longitudinal movement with the shaft. Mounted in the lower part of the frame preferably at right angles to the shaft is a spindle carrying a worm gear wheel which meshes with the worm on the shaft or shaft extension, and also carries a cam shaped member. Pivoted at the upper part of the frame is an arm, the lower end of which extends downward into engagement with the cams so that when the latter is rotated with the spindle the arm is given an oscillatory movement. The arm is provided with anti-friction roller bearings which bears on the end of the shaft or extension thereof so that the oscillatory movement of the arm is transmitted to the shaft. Since there is a positive driving connection between the shaft and the spindle which furnishes the oscillatory movement to the pivoted arm, there can be no slip between the oscillator and the shaft as is the case when frictional drives are employed.

My invention consists in the details of construction and the combination and arrangements of parts described in the specification and set forth in the appended claims.

For a better understanding of my invention reference is had to the accompanying drawing in which Figure 1 is a section of a portion of a shaft and bearing having my improved shaft oscillator applied thereto; and Fig. 2 is an end view of the same.

Referring now to the figures of the drawing in which I have shown the best form of my invention now known to me, 10 represents a rotary shaft mounted in a bearing 11 incased in a bearing housing 12. The shaft is provided at one end with an extension 13 which in this case is a separate member secured by screws 14 to the end of the shaft. If desired, however, the extension 13 which is preferably smaller in diameter than the shaft may be an integral part thereof. Secured to the end of the bearing housing by screws 15 is a frame 16 which supports parts of the shaft oscillator. Mounted on the shaft extension 13 is a worm 17. The worm 17 engages loosely the extension 13 being secured to the extension only by a feather 18 so that the worm rotates with the shaft but relative movement in an axial direction is permitted. The movement of the worm longitudinally of the shaft is prevented in this case by an arm 19 integral with the frame 16. The arm 19 is provided with an opening in which the end of the shaft extension 13 is located and is provided on each side of the shaft with a pair of ears or lugs 20 in which are mounted inwardly extending pins 21 which engage a continuous groove 22 in one end of the worm 17.

Supported on outwardly extending arms 23 on the lower part of the frame 16 and at substantially right angles to the shaft, is a spindle 24, on which is mounted a worm gear 25 which meshes with the worm 17. Thus the rotary movement of the wheel 17 is transmitted to the spindle 24 which rotates at a much lower speed than the shaft. Fixed to the spindle at each side of the worm wheel 24 is a cam-shaped member 26 provided on its periphery with a shoulder 27.

Pivoted between a pair of lugs 28 at the upper part of the frame 16 is a U-shaped oscillatory arm 29 which extends outward and downward over the shaft extension and is bifurcated at its lower free end, the two prongs of the end being located on opposite sides of the worm wheel 25 and extending downward into engagement with the peripheries of the cam-shaped members 26. Mounted in the oscillatory arm 29 in line with the center of the shaft is an adjustable screw-threaded member 30 having an enlarged head 31 in which is secured by a removable plate 32 an anti-friction ball 33, which normally rests on the end of the shaft extension 13. Coiled about the hubs 34 of the oscillatory arm 29 is a spring 35 which presses the arm 29 downward with the ball 33 in engagement with the shaft.

The operation of the device will now be explained:—When the shaft is rotated, rotary movement is transmitted to the spindle 24 and cams 26 by means of the worm and worm wheel. As the cam rotates slowly the oscillatory arm 29 is gradually moved to the left due to the gradually increasing radius of the cam-shaped member until the lower ends of the arm 29 pass the shoulder 27. As the arm 19 is moved to the left the shaft is moved to the left against the normal bias of the machine. The normal bias in a dynamo-electric machine is produced by the action of the magnetic field in which the armature rotates. When the ends of the arm 29 pass the shoulder 27 the shaft is moved to the right by the action of magnetic fields until the bifurcated end of the arm again engages the cam-shaped members 26. It is seen that the shaft is oscillated continuously the period of oscillation depending for each particular oscillator on the speed of rotation. If it is desired to adjust the period of oscillation all that is necessary is to substitute for the gear 17 and 26, other gears having threads of a different pitch. If it is desired to adjust the extent of oscillation, all that is necessary is to adjust the position of the screw-threaded member 30, or to substitute another cam having a greater eccentricity.

It is evident that many changes can be made in the details without departing from the spirit and scope of my invention, and I aim in my claims to cover all such changes.

What I claim as new and desire to secure by Letters Patent is:—

1. In combination, a rotary shaft, a rotary spindle driven by said shaft, and oscillatory means operated by said spindle for moving the shaft longitudinally in its bearings.

2. In combination, a rotary shaft, a rotary spindle driven by the shaft, an arm pivoted to a stationary support and bearing on the end of the shaft, and means for reciprocating the arm from said spindle.

3. In combination, a rotary shaft, a toothed wheel positively driven thereby, and means operated by said wheel for oscillating said shaft.

4. In combination, a rotating shaft, a gear wheel rotating therewith, a second gear wheel meshing with the first gear wheel, and means operated by said second gear wheel for moving said shaft longitudinally in its bearings.

5. In combination, a rotary shaft, a spindle at substantially right angles to the shaft, a driving connection between the shaft and spindle, and an arm pivoted to a stationary support and reciprocated by said spindle, said arm bearing on the shaft.

6. In combination, a rotary shaft, a spindle driven by said shaft, a cam carried by said spindle, and a pivoted member reciprocated by the cam and bearing on the shaft.

7. In combination, a rotary shaft, a spindle at substantially right angles thereto, a gear wheel connection between the shaft and spindle, and a pivoted arm reciprocated by the spindle longitudinally of the shaft so as to oscillate the latter.

8. In combination, a rotary shaft, a spindle, a gear wheel connection between the shaft and spindle, a cam driven by the spindle, a pivoted arm reciprocated by the cam and bearing on the end of the shaft.

9. In combination, a rotary shaft, a rotary cam, a worm and worm wheel connection between the cam and shaft, one of the worm wheel members being mounted on the shaft so as to have a rotary movement only, a pivoted arm reciprocated by the cam in the plane of the longitudinal axis of the shaft, and a member carried by the arm and bearing on the shaft.

10. In combination, a rotary shaft, a spindle, a cam-shaped member thereon, a gear wheel connection between the shaft and spindle, one of the gear-wheels being mounted on the shaft so that the latter can move longitudinally thereof, a pivoted arm reciprocated by said cam, and anti-friction means carried by the arm for transmitting its movement to the shaft.

11. In combination, a rotary shaft, a bearing and bearing-housing, a frame secured to the housing, a gear-wheel mounted on the shaft so that the shaft can have a longitudinal movement relative thereto, a stationary arm on the frame and engaging the gear-wheel so as to prevent longitudinal movement thereof, a spindle at substantially right angles to the shaft, a cam and gear wheel carried by the spindle, said last named gear wheel meshing with the gear wheel on the shaft, an arm pivoted to the frame and engaging the cam so as to have a reciprocatory movement, and an anti-friction roller bearing carried by the pivoted arm and bearing on the end of the shaft.

In testimony whereof I affix my signature, in the presence of two witnesses.

WILL F. BOUCHÉ.

Witnesses:
RUBY ROBINSON,
FRED J. KINSEY.